United States Patent [19]

Licata

[11] 4,173,785
[45] Nov. 6, 1979

[54] INERTIAL GUIDANCE SYSTEM FOR VERTICALLY LAUNCHED MISSILES WITHOUT ROLL CONTROL

[75] Inventor: William H. Licata, Stone Mountain, Ga.

[73] Assignee: The United States of America as represented by the Secretary of the Navy, Washington, D.C.

[21] Appl. No.: 909,326

[22] Filed: May 25, 1978

[51] Int. Cl.² .............................................. G06F 15/50
[52] U.S. Cl. ...................................... 364/453; 244/3.2
[58] Field of Search ........................... 364/453; 244/3.2

[56] References Cited

U.S. PATENT DOCUMENTS

| | | | |
|---|---|---|---|
| 3,198,940 | 8/1965 | Loper et al. | 364/453 |
| 3,693,909 | 9/1972 | Hall | 244/3.2 |
| 3,746,281 | 7/1973 | Stripling | 244/3.2 |
| 3,924,824 | 12/1975 | Brodie et al. | 244/3.2 |
| 4,038,527 | 7/1977 | Brodie et al. | 364/453 |
| 4,123,019 | 10/1978 | Amberntson | 244/3.2 |

Primary Examiner—Jerry Smith
Attorney, Agent, or Firm—R. S. Sciascia; A. L. Branning; G. J. Perry

[57] ABSTRACT

An electronic guidance system which when provided with a set of target position coordinates prior to launch, calculates the missile position and velocity in an inertially fixed coordinate system during flight. All inertial coordinate system variables are defined by a three axis orthorganal coordinate system centered on the target position. This guidance system functions without an active roll control by continuously pointing the velocity vector of the missile towards the target position.

16 Claims, 12 Drawing Figures

INERTIAL GUIDANCE SYSTEM FOR VERTICALLY LAUNCHED MISSILES WITHOUT ROLL CONTROL

BACKGROUND OF THE INVENTION

This invention pertains to inertial guidance systems and more specifically to such systems utilized by missiles not having active roll control.

Guidance system for missiles are defined to be "inertial" when they calculate missile position and velocity in an inertial fixed coordinate system and then processes this data to provide steering commands. Generally data calculated relative to an inertial fixed coordinate system is achieved by maintaining an inertial platform within a missile which maintains its position relative to earth space. Such systems, although quite effective, are extremely costly due to their mechanical and electronic complexity. In addition, such systems are designed to operate in missiles having active roll control.

Due to the extreme cost of producing such full up inertial platform systems, the missile guidance community has felt a long standing need to develop an inertial guidance system that is mechanically and electronically less complex and therefore less expensive to produce.

SUMMARY OF THE INVENTION

Accordingly, there is provided an inertial guidance system for vertically launched missiles not having active roll control. The system according to the present invention is based upon a guidance law which continuously points the missile's velocity vector toward its target. The system according to the present invention includes a pseudo roll control subsystem which constrains the missile to fly in a plane which reduces the guidance problem to a two dimensional one, thereby substantially reducing system complexity. A target plane is defined to include the target point and the z-axis of a three axis orthogonal coordinate system centered at the target. All missile maneuvers are constrained to occur in this plane and are controlled by the pseudo roll control system. An external target localization system provides information related to target range, elevation, and bearing to the missile prior to launch.

The inertial guidance system according to the present invention includes five major subsystems: (1) velocity vector direction calculation, (2) target coordinate calculation, (3) error generation, (4) pseudo roll control and pitch damping, and (5) autopilot.

The velocity vector direction calculation subsystem employs yaw, pitch, and roll rate sensors to provide raw data. A sine/cosine module calculates the sine and cosine of the integrated roll rate signal. The yaw rate signal is multiplied by the sine of the integrated roll rate signal and the pitch rate signal is multiplied by the cosine of the integrated roll rate signal. These multiplied yaw and pitch rate signals are summed and integrated to produce a signal proportional to the direction of the missile's velocity vector.

The target coordinate calculation subsystem calculates coordinates in the target plane. Two integrators containing target coordinates are initiated prior to launch by data from an external target localization system. These integrators are updated during flight with data from an accleration sensor having a sensitive axis along the missile center line and the direction of the velocity vector. The initial bias of one G, indicated by the acceleration sensor when the missile is not moving, is cancelled by a G reference signal multiplied by the cosine of the angle of the missile's velocity vector. A signal proportional to the angle of the missile's velocity vector is coupled to a sine/cosine module which calculates the sine and the cosine of this angle. Both the cosine of the velocity vector angle and the G reference are multiplied and that product summed with the output of the acceleration sensor. The resulting summation output is integrated and coupled to multipliers which are in turn coupled to integrators providing target coordinate information in the target plane.

The error generation subsystem actually implements the guidance law which continuously points the missile's velocity vector in the direction of its target. Target frame coordinates are converted to polar form and multiplied by the sine and the cosine of the angle of the missile's velocity vector. These outputs are summed to produce an error signal which is then amplified and limited to produce a thruster signal. Amplifier gain is determined to be a function of the missile dynamics and is limited to a value consistent with maximum thruster deflection.

The pseudo roll control and pitch damping subsystem mathematically maintains the missile flight in the target plane. The angular rate of change of the missile velocity vector is multiplied by both the cosine and sine of the bearing angle $\delta$ to produce signals for pitch and yaw thruster instruction. Gain factors of amplifiers carrying angular rate information, pitch rate, and yaw rate determine system damping.

The autopilot subsystem includes many of the same components of the pseudo roll control and pitch damping system. In essence, the sine and cosine of bearing angle $\delta$, multiplied by the sum of the missile's velocity vector angular rate and error signal from the error generation subsystem, produce pitch and yaw thruster commands.

OBJECTS OF THE INVENTION

It is therefore an object of the present invention to provide a guidance system for vertically launched missiles.

A further object of the present invention is to provide an inertial guidance system for vertically launched missiles not having active roll control.

Yet another object of the present invention is to provide an inertial guidance system that will allow for interception of a point in space defined by an external target localization system.

Still another object of the present invention is to provide an uncomplicated an inexpensive inertial guidance system for vertically launched missiles.

A still further object of the present invention is to provide an inertial guiance system having fast start up time.

A further object of the present invention is to provide an inertial guidance system that is physically small in size.

Yet another object of the present invention is to provide an inertial guidance system capable of easily being shock hardened.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

FIG. 2 comprising

DESCRIPTION OF THE PREFERRED EMBODIMENTS

Figure 1:
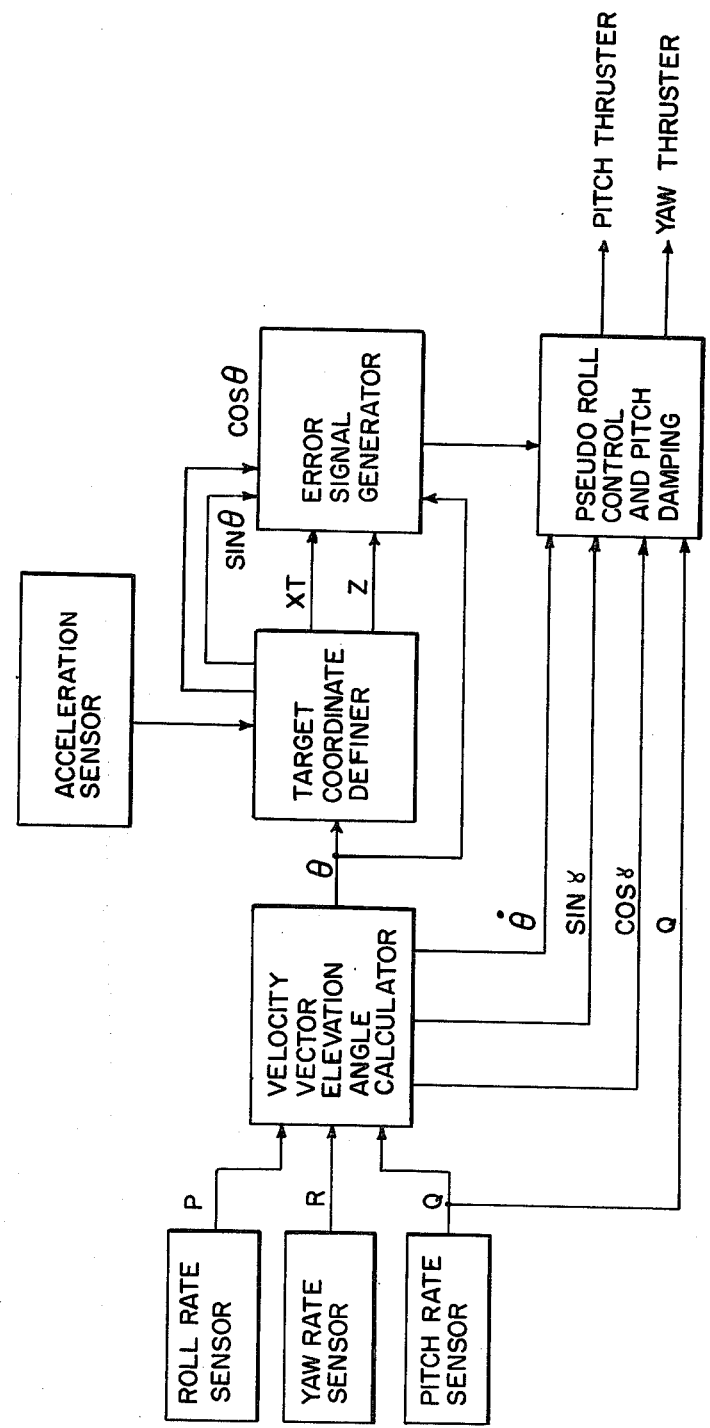
FIG. 1 is a functional block diagram of the inertial guidance system according to the present invention.
Figure 2A:
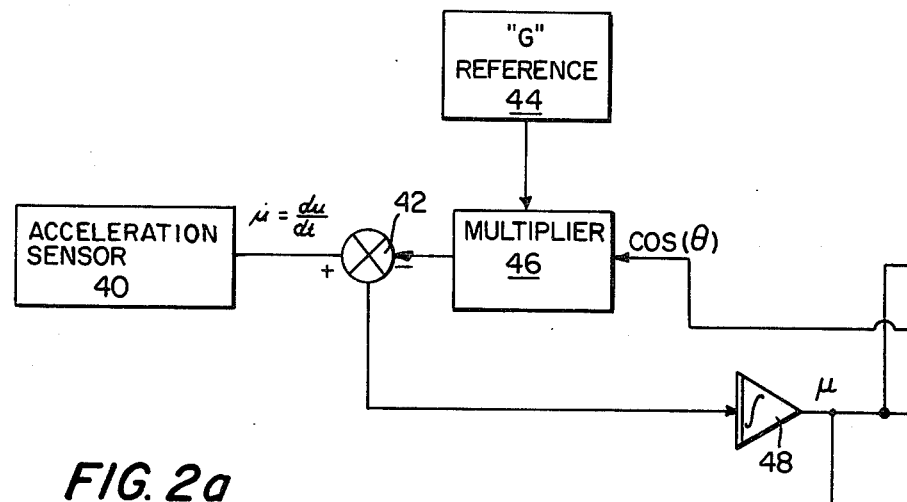
FIGS. 2a and 2b is a detailed block diagram of the inertial guidance system according to the present invention.
Figure 2A:
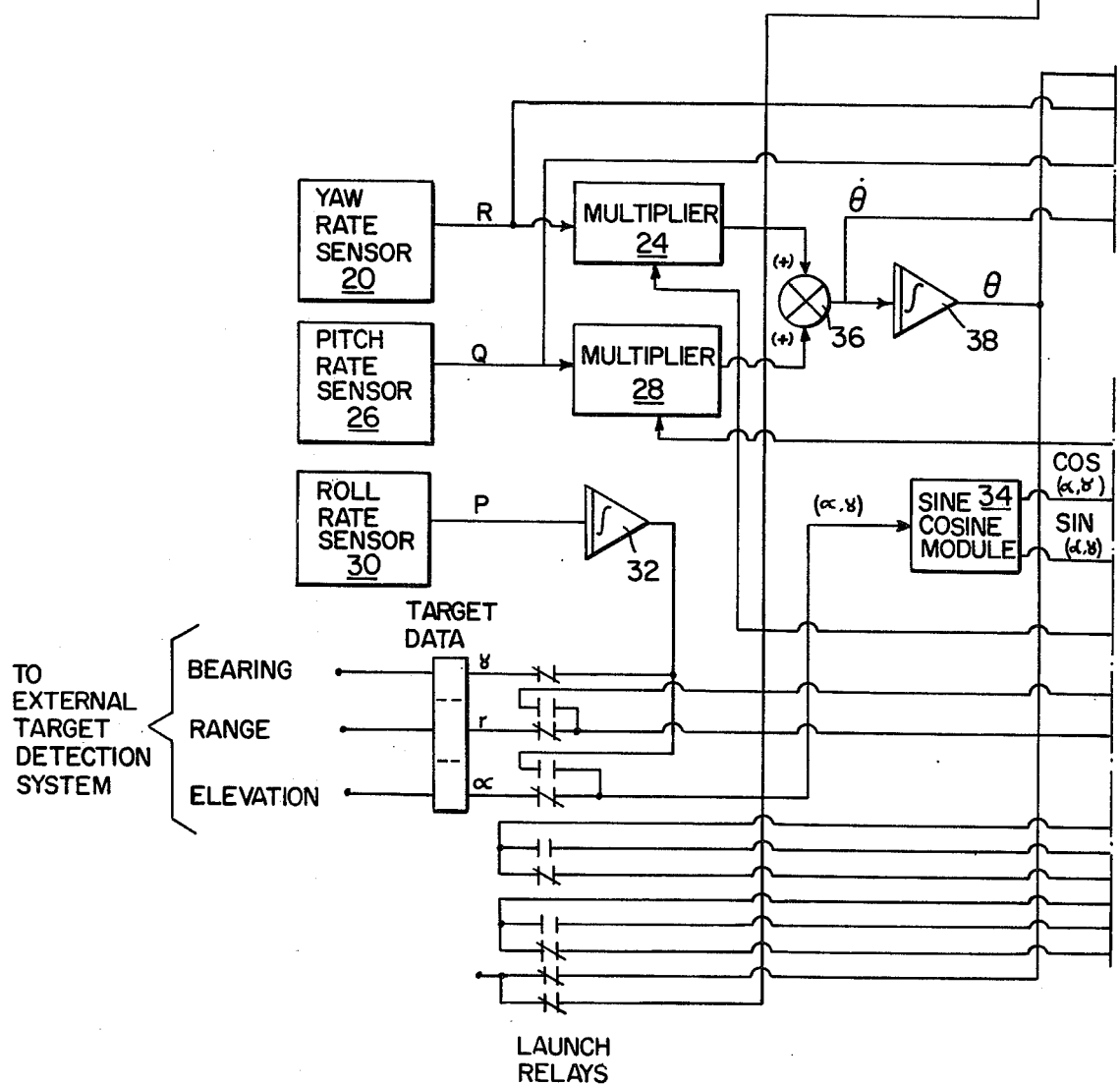
Figure 2B:
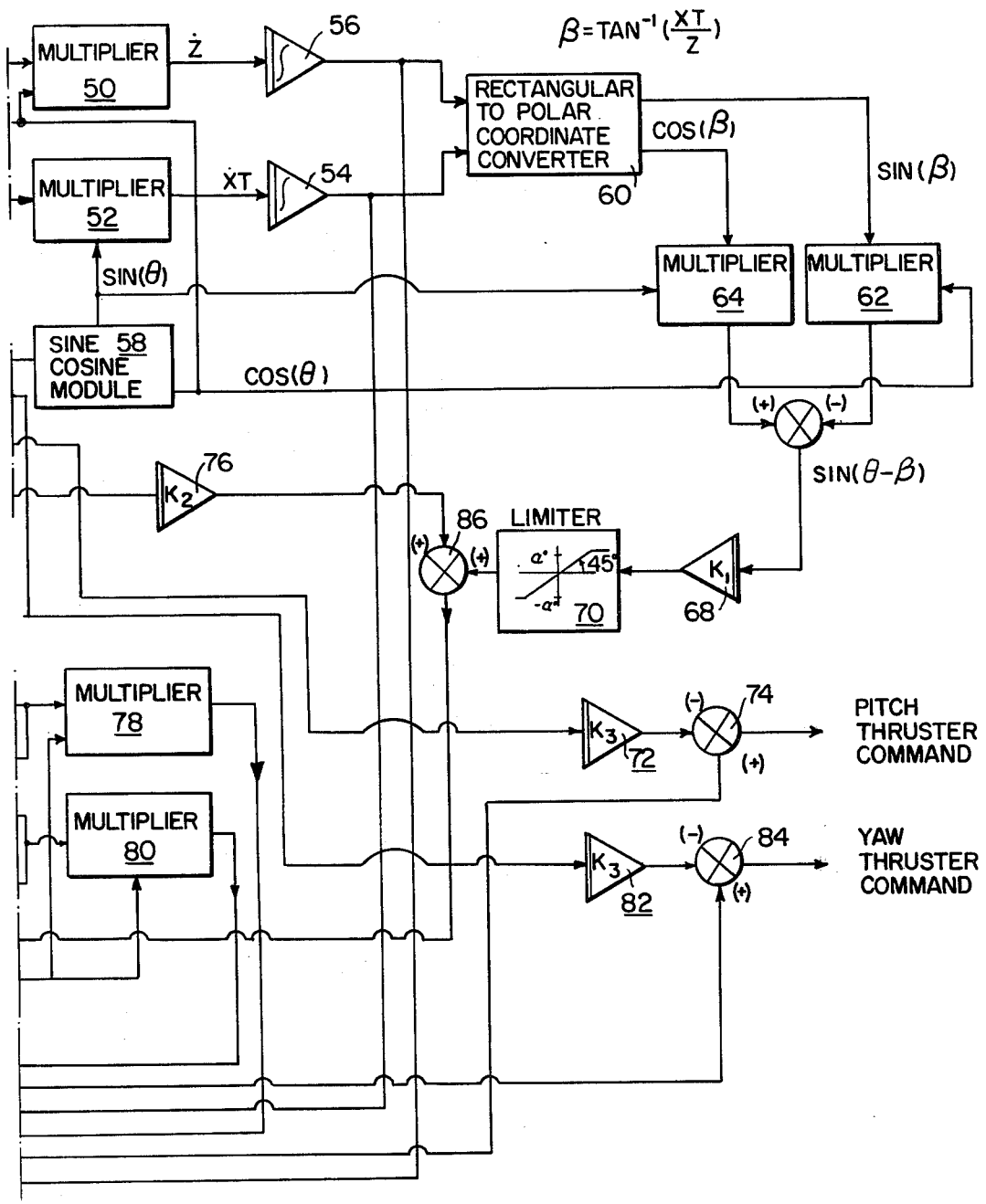

The primary objective of the inertial guidance system according to the present invention which is functionally diagramed in FIG. 1 and shown in detailed block diagram form in FIG. 2, is to provide steering guidance for vertically launched missiles not having active roll control so that they can intercept target points defined by external target localization means. This primary object is implemented through the use of a guidance law which continuously adjusts the missile velocity vector U toward the target point. A pseudo roll control system constrains the missile to fly in a plane which reduces the guidance problem to two dimensions.

Figure 3:
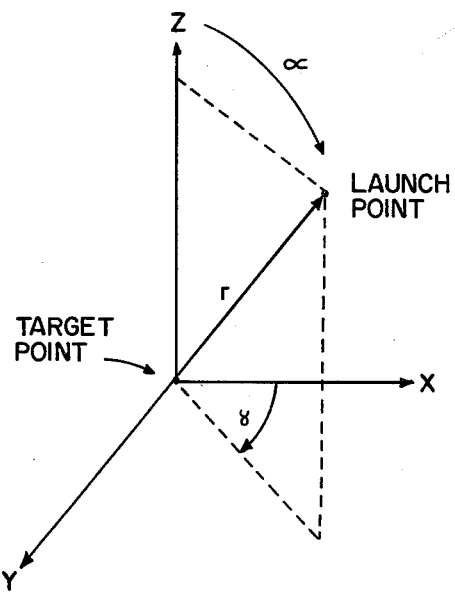
FIG. 3 schematically defines the inertial coordinate system in relation to the launch and target points prior to missile flight.

Referring now to FIG. 3, the guidance system according to the present invention defines a three dimensional orthogonal coordinate system about the target point. X, Y, and Z axes, mutually orthogonal, join at a target point. Range from target point to launch point is defined by r, elevation, α, is defined relative to the Z axis, and bearing, δ, is defined relative to the X axis.

Figure 4:
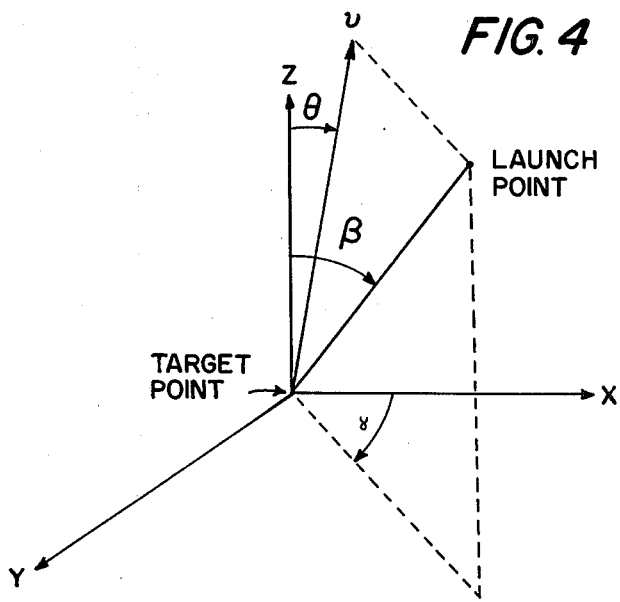
FIG. 4 schematically defines the relationship of the velocity vector U to the inertial coordinate system when the missile is in flight.

FIG. 4 schematically defines the relationship of the velocity vector U to the inertial coordinate system when the missile is in flight. The elevation angle θ of the missile's velocity vector is defined relative to the Z axis. Target elevation during missile flight β is defined relative to the Z axis. Bearing, δ, continues to be defined relative to the X axis in flight.

Figure 5:
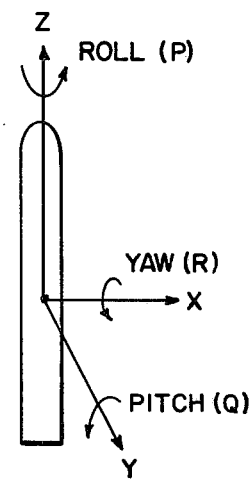
FIG. 5 schematically defines roll (P), pitch (Q), and yaw (R) as used throughout the description.

Further definitions are schematically depicted in FIG. 5 which define roll (P), pitch (Q), and yaw (R) as used throughout the description.

The guidance system according to the present invention, depicted functionally in FIG. 1, is defined to be an inertial guidance system because it calculates the missile's position and velocity in an inertially fixed coordinate system, and then makes use of this inertial data to steer the missile. A thrust vector control steering system is assumed, but a missile using fins for steering can also make use of the inertial guidance system according to the present invention. The inertial coordinate system from which all system variables are defined is a three axis orthogonal coordinate system centered at the target position. The orientation of this inertial coordinate system is the same orientation it would have if it were placed at the center of gravity of the missile with the Z axis pointing from its tail towards its nose. This orientation is schematically depicted in FIG. 5.

A target localization system, external to the inertial guidance system, provides the missile utilizing this system with target coordinates prior to missile launch. Range to target (r), elevation (α), measured in degrees relative to the Z axis, and bearing (δ), measured in degrees off of the X axis, are all provided by the external target localization means. These three pieces of information are schematically depicted in FIG. 3. The Z axis and bearing angle, δ, define a plane known as the target plane because it includes the target point and the Z axis. All missile maneuvers are constrained to be in this target plane (a function performed by the pseudo roll control system to be discussed further on in this description). Target position in the target plane is defined by the target range (r) and the elevation angle (α). These two coordinates define two new rectangular coordinates, z, xt, where z is the old Z coordinate and xt is $(X^2+Y^2)$.

As the missile flies in the target plane towards the target point, the inertial guidance system using sensor data from a yaw rate sensor 20, a pitch rate sensor 26, a roll rate sensor 30, and an acceleration sensor 40 which measures acceleration along the center line of the missile, updates the missile position relative to the target. This allows the missile to continuously monitor the value of target elevation data relative to the Z axis. In addition, by integrating the total turning rate of the missile in the target plane, the elevation angle θ of the missile velocity vector U, is approximated. By rotating the missile, the guidance system can align θ and β thereby pointing the velocity vector U toward the target. This scheme assures that the missile will pass through the target point.

To aid in the understanding of the functional block diagram of FIG. 1, it has been broken up into five major subsystems, schematically depicted in FIGS. 6 through 10. FIG. 11 schematically details the "hardware" equivalents of several of the functional block diagram elements.

Referring now to FIG. 11, several of the functional block diagram elements are shown in the left column of this figure. An actual hardware circuit equivalent for these functional block diagram elements is shown in the right column. A summer having positive and negative inputs is illustrated schematically as an operational amplifier having inverting and noninverting input ports and a negative feedback resistor. A summer having two positive input ports is schematically shown as a pair of operational amplifiers. Both positive inputs to the summer are shown as input resistors coupled to the inverting input of a first operational amplifier having resistive feedback. The output of this first operational amplifier is resistor coupled to the inverting input of a second operational amplifier also having resistive feedback. An integrator is schematically shown as a capacitor, and a block having gain K is shown as an operational amplifier having inverting and noninverting inputs where the input to gain element k is resistive coupled by a resistor $R_1$ to this inverting input and a resistor $R_2$ couples the output of the operational amplifier to the inverting input. K is equal to $R_2/R_1$.

Figure 6:
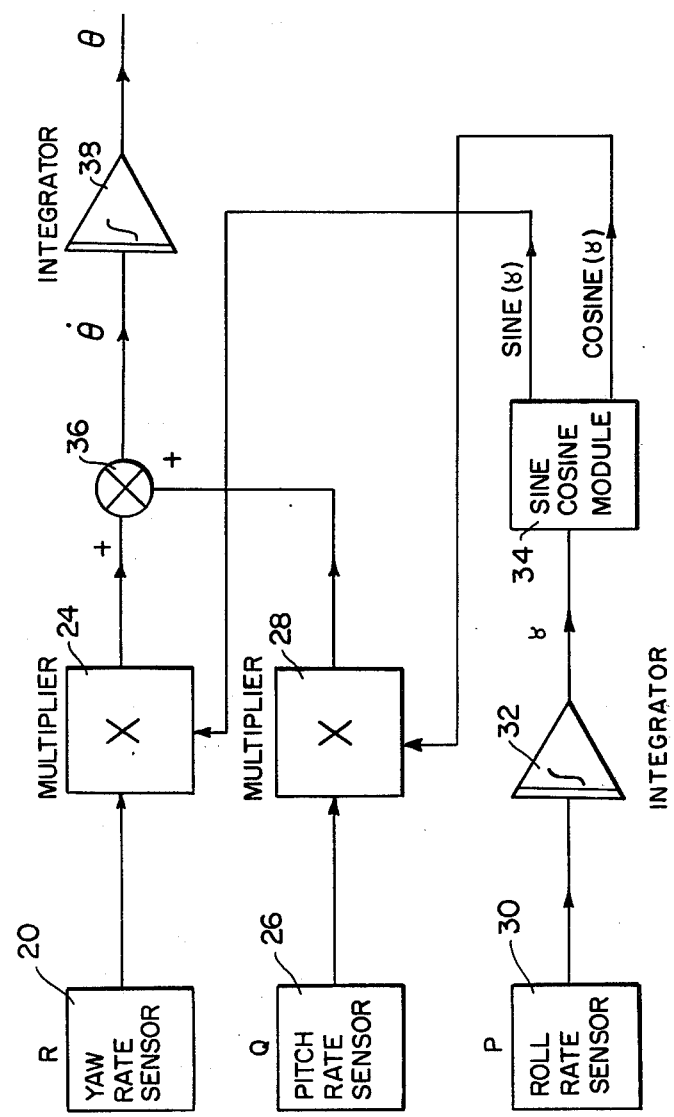
FIG. 6 is a functional block diagram of the velocity vector direction calculation subsystem.

Referring now to FIG. 6, which is a functional block diagram of the velocity vector direction calculation subsystem, yaw, pitch, and roll rates are supplied by sensors 20, 26, and 30. The functional block diagram depicted is based upon two assumptions: First, the velocity U is coincident with the center line of the missile, and secondly, the rotational vector having pitch component Q and yaw component R, in the X,Y-plane is perpendicular to the target plane (i.e., the missile always rotates towards or away from the target but never out of the target plane). Since the missile may roll during its flight, the bearing of the target plane must be rotated by the amount that the missile rolls, i.e., P. The target plane isn't actually rotated, but rather a constant is added to the bearing of the target plane (integral of P) to account for the change in orientation of the axis of the thrust vector control system relative to the target plane.

Yaw rate sensor 20 is coupled to one input of a multiplier 24. Pitch rate sensor 26 is coupled to one input of a multiplier 28. Roll rate sensor 30 is couled to the input of an integrator 32. The output of integrator 32 is equal to δ, the bearing relative to the X axis. The output of the integrator 32 is coupled to a sine/cosine module 34 which calculates both the sine and cosine of δ. The output of sine/cosine module 34 carrying sine (δ) is coupled to the second input of multiplier 24, and the output of sine/cosine module 34 carrying cosine (δ) is coupled to the second input of multiplier 28. The output of multipliers 24 and 28 are coupled to a summer 36 having two noninverting inputs. The output of summer 36 is equal to the first derivative of the elevation angle of the missile's velocity vector U and is denoted as $\dot{\theta}$. This output from summer 36 is coupled to the input of an integrator 38 having output equivalent to θ, the elevation angle of the missile's velocity vector U.

Using the assumptions above, the following relations exist:

$$R = \dot{\theta} \sin(\delta)$$

$$Q = \dot{\theta} \cos(\delta)$$

$$R \sin(\delta) + Q \cos(\delta) = \dot{\theta}(\cos^2(\delta) + \sin^2(\delta)) = \dot{\theta}.$$

The third equation above is the calculation actually taking place in the velocity vector direction calculation subsystem of FIG. 6.

Figure 7:
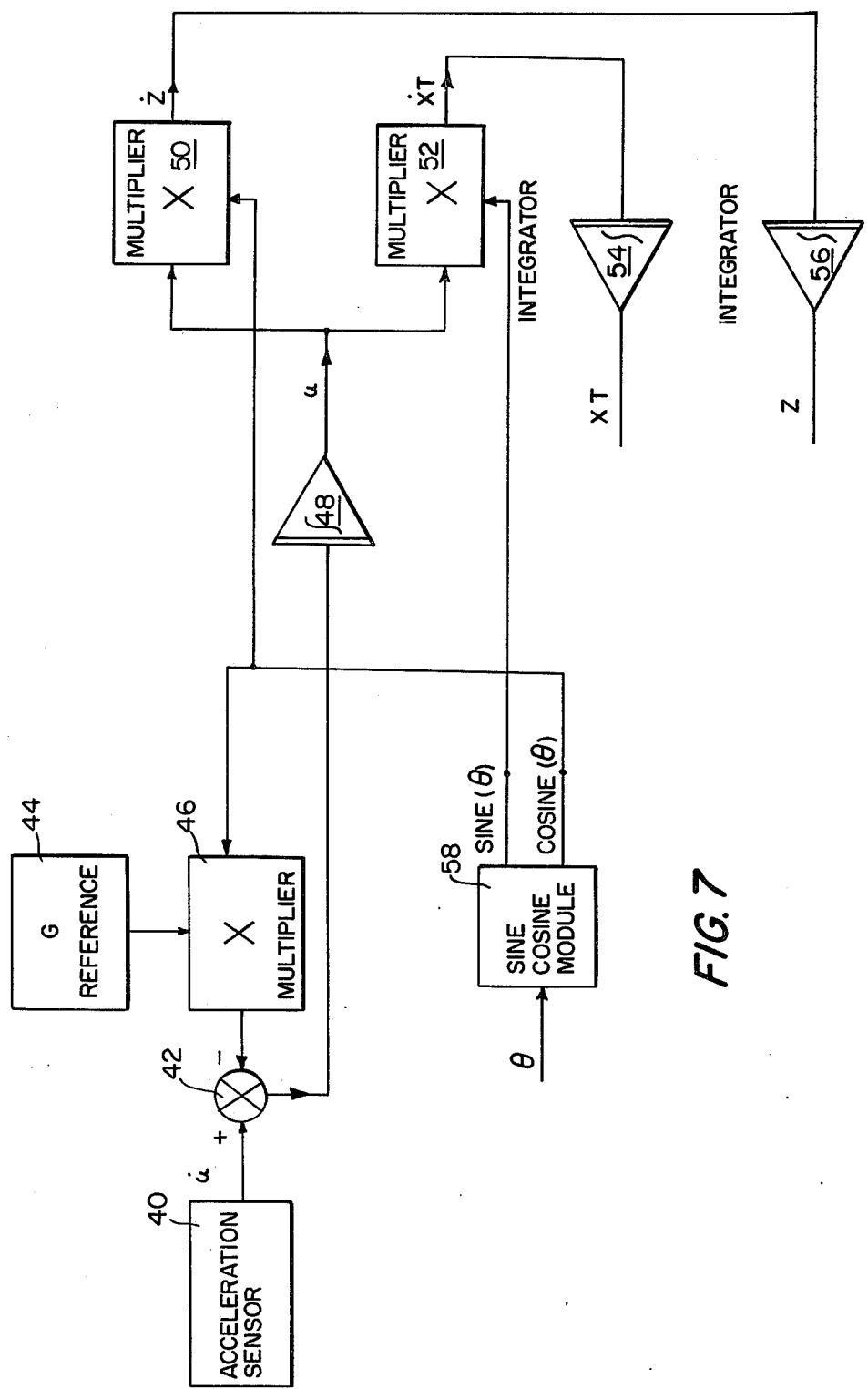
FIG. 7 is a functional block diagram of the target coordinate calculation subsystem.

Referring now to FIG. 7, which is a functional block diagram of the target coordinate calculation subsystem, this subsystem calculates the target coordinates in the target plane. Acceleration sensor 40 having an output equal to the first derivative of velocity, $\dot{u}$, is coupled to the noninverting input of a summer 42. The output of integrator 38 (θ) shown on FIG. 6, is coupled to the input of a sine/cosine module 58. Sine/Cosine module 58 produces both a sine (θ) output and a cosine (θ) output. The cosine (θ) output of sine/cosine module 58 is coupled to one input of a multiplier 46. A G reference module 44, supplying the mathematical representation of acceleration due to gravity (approximately 32.17 feet/sec$^2$), is coupled to the second input of multiplier 46. The output of multiplier 46 is coupled to the inverting input of summer 42. The output of summer 42 is coupled to the input of an integrator 48, the output of which is equivalent to missile velocity, U. The output of integrator 48 is coupled to one input of each of two multipliers 50 and 52. The second input to multiplier 50 is coupled to the cosine (θ) output of sine/cosine module 58, and the second input of multiplier 52 is coupled to the sine (θ) output of this sine/cosine module. This circuit arrangement produces a signal equivalent to $\dot{z}$ at the output of multiplier 50 and a signal equivalent to $\dot{x}t$ at the output of multiplier 52. The output of multiplier 50 is coupled to the input of an integrator 56, the output of which will mathematically be equal to Z. The output of multiplier 52 is coupled to the input of an integrator 54 the output of which will be the mathematical equivalent of xt. Integrators 54 and 56 containing the target cooridnates are initiated prior to launch with the initial target coordinates calculated from the input data from the external target localization means. These coordinates (the integrators) are updated during the flight with data from acceleration sensor 40 having a sensitive axis along the missile centerline and with the direction of the missile velocity vector (U) from the velocity vector direction calculation subsystem diagram in FIG. 6. Acceleration sensor 40 should indicate one "G" when the missile in vertical but stationary. This bias is a false signal due to gravity and must be cancelled. This cancellation is accomplished by multiplying the value of acceleration due to gravity (approximately 32.17 feet/sec$^2$) from G reference module 44, by the cosine of θ from sine/cosine module 58, to produce the component of acceleration due to gravity along the centerline of the missile. This corrected value of U is integrated by integrator 48 to produce the missile velocity. The vertical components of U, $\dot{z}$, and the forward components of U, $\dot{x}t$, are calculated by multiplying U by the cosine and sine of θ, respectively, in multipliers 50 and 52. By integrating in integrators 54 and 56 the two velocity components, the missile position is computed.

Figure 8:
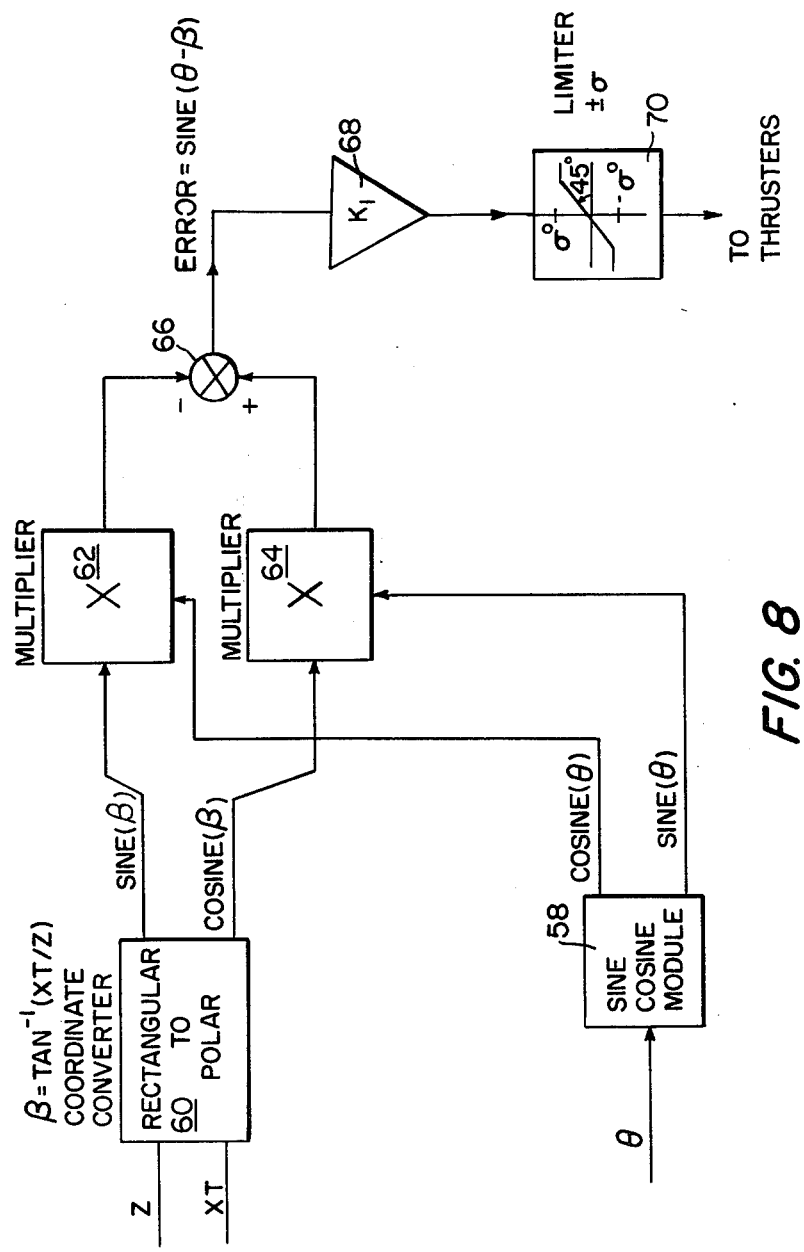
FIG. 8 is a functional block diagram of the error generation subsystem.

The error generator circuit subsystem is detailed in FIG. 8. To implement the guidance law, it is necessary to calculate the value of the error signal θ minus the target elevation relative to the Z axis β. θ is already known, but β must be calculated. From a circuit design standpoint, it is easier to calculate the sine of (θ−β) which is a good approximation of (θ−β) for small values of error. This is accomplished by just calculating the sine and cosine of β and not β itself. The outputs of integrators 54 and 56 are coupled to the two inputs of a rectangular to polar coordinate converter 60. Converter 60 calculates $\beta = \tan^{-1}(xt/z)$ and has outputs equal to sine β and cosine β. The sine β output of converter 60 is coupled to one input of a multiplier 62 and the cosine (β) output of converter 60 is coupled to one input of a multiplier 64. The cosine (θ) and sine (θ) outputs of sine/cosine module 58 are coupled to the second inputs of the multipliers 62 and 64, respectively. The outputs of multipliers 62 and 64 are coupled respectively to the inverting and noninverting inputs of a summer 66. The output of summer 66 will be mathematically equivalent to an error signal equal to sin (θ−β). This error signal from the output of summer 66 is coupled to the input of an amplifier 66 having gain $K_1$. The output of amplifier 68 is coupled to a limiter 70. The output of limiter 70 is used to trigger the missile's thrusters. Returning to amplifier 68, the error signal from summer 66 is multiplied by a gain which is a function of the missile dynamics and limited to a value coincident with the maximum value of thruster deflection allowed. Limiter 70 is used to prevent the thruster mechanism from saturating and driving the missile into a non-linear operating region.

Figure 9:
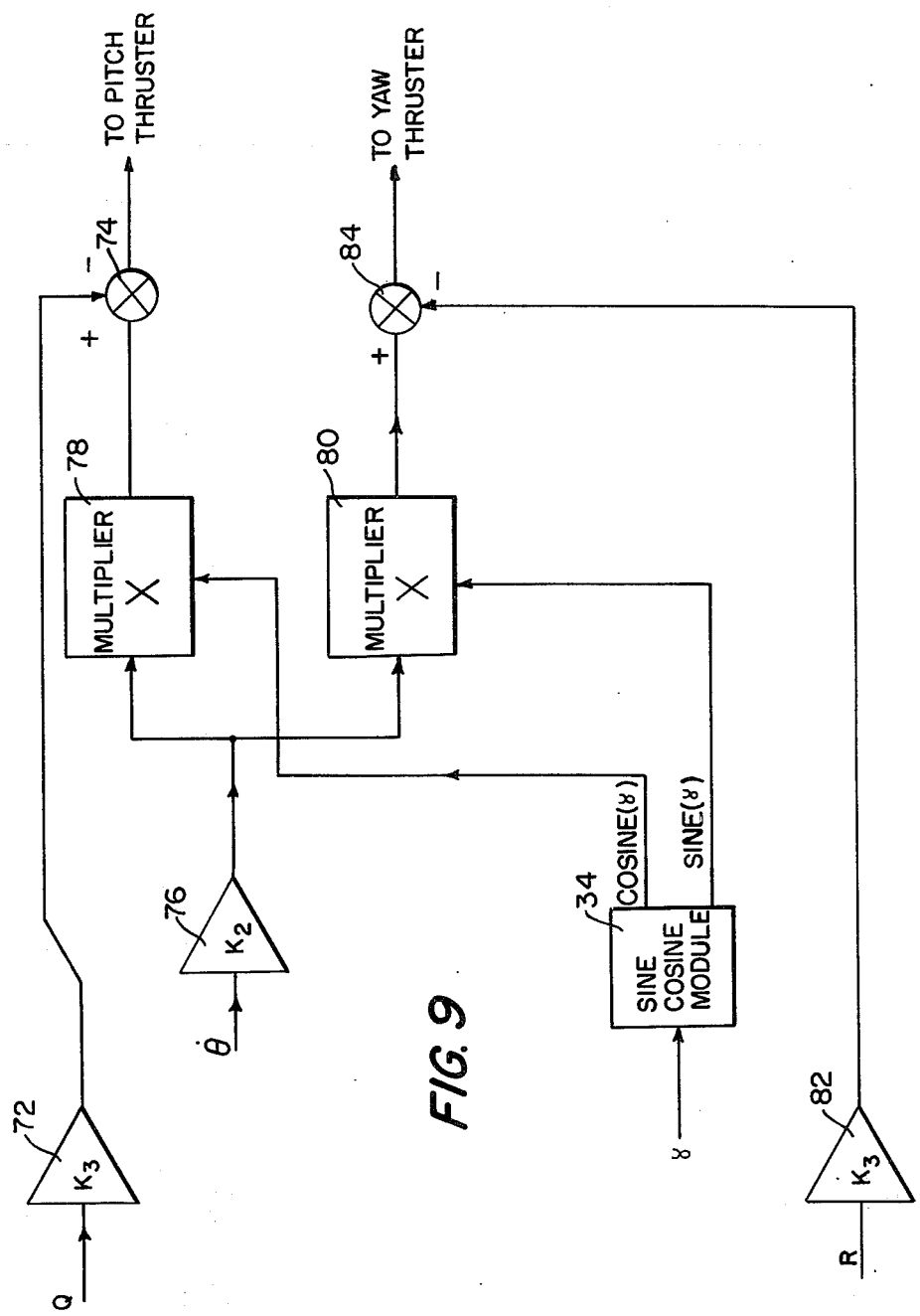
FIG. 9 is a functional block diagram of the pseudo roll control and pitch damping subsystem.

Referring now to FIG. 9, there is shown a functional block diagram of the pseudo roll control and pitch damping subsystem. The output of pitch rate sensor 26, in addition to being coupled to the input of multiplier 28, is also coupled to the input of an amplifier 72 having gain $K_3$. The output of summer 36, coupled to the input of integrator 38, is also coupled to the input of an amplifier 76 having gain $K_2$. Thus, the input signal to amplifier 76 is the equivalent of $\dot{\theta}$. The output of yaw rate sensor 20, coupled to one input of multiplier 24, is also coupled to the input of an amplifier 82 having gain $K_3$. Sine/cosine module 34 has been shown on FIG. 6 and previously discussed. The output of amplifier 76 is coupled to one input each of two multipliers 78 and 80. The cosine ($\delta$) output of sine/cosine module 34 is coupled to the second input of the multiplier 78 and the sine ($\delta$) output of sine/cosine module 34 is coupled to the second input of multiplier 80. The output of multiplier 78 is coupled to the noninverting input of a summer 74 and the output of amplifier 72 is coupled to the inverting input of that summer. The output of summer 74 is coupled to the pitch thruster of the missile. The output of multiplier 80 is coupled to the noninverting input of a summer 84. The output of amplifier 82 is coupled to the inverting input of that summer. The output of summer 84 is coupled to the yaw thruster of the missile.

If the missile is maneuvering in the target plane (proper roll control), Q is equal to $\dot{\theta}$ multiplied by cosine ($\delta$); and R is equal to $\dot{\theta}$ multiplied by sine ($\delta$). Gain $K_2$ of amplifier 76 is larger than gain $K_3$ of amplifiers 72 and 82. An error signal defined by the following expression is fed to the pitch thruster control system:

$$(K_2-K_3)\dot{\theta}+K_3(\theta/\text{cosine}(\delta)-Q).$$

The gain $K_2$ minus $K_3$ multiplies the angular rate $\dot{\theta}$ and this term represents rate damping to improve missile stability. Gain $K_3$ multiplies the error term $\dot{\theta}/\text{cosine}(\delta)$ $-Q$. This second error term moves the thruster to increase or decrease Q until Q equals $\dot{\theta}$ cosine ($\delta$) (the missile is maneuvering only in the target plane). A similar error term holds for the yaw thruster.

Figure 10:
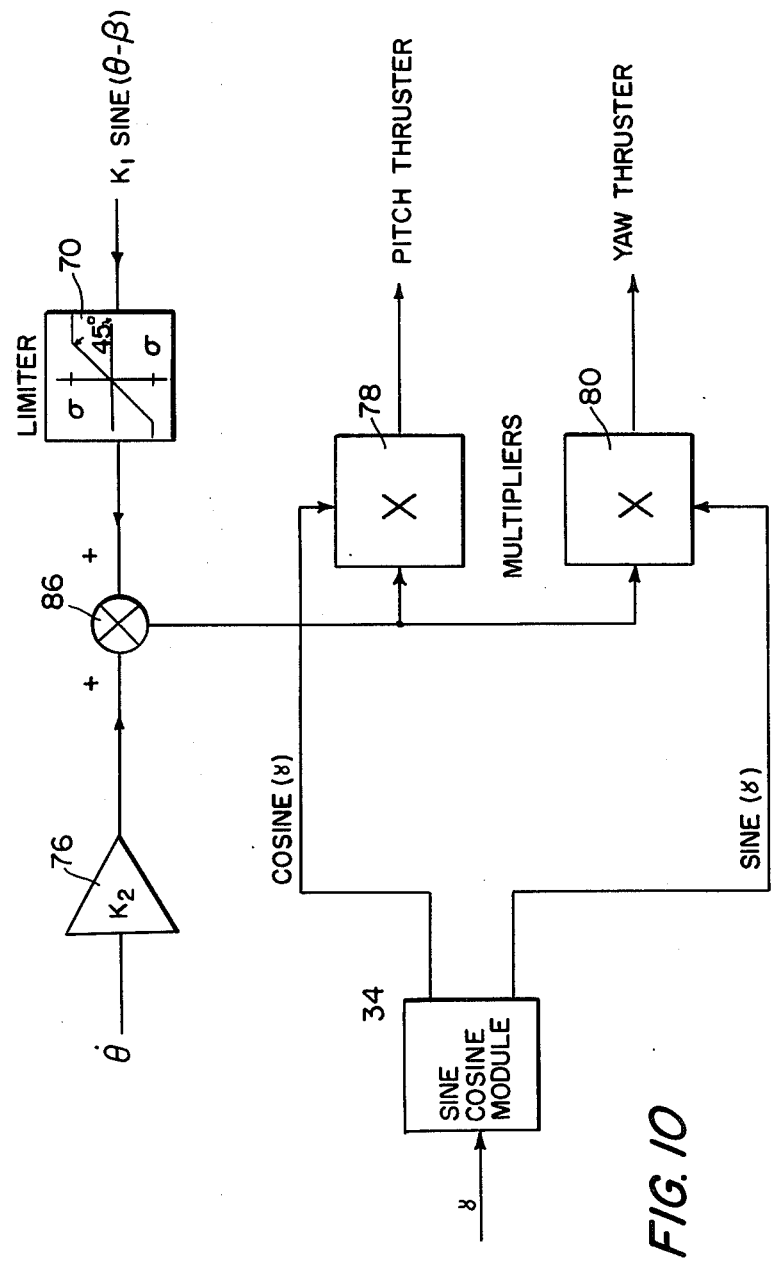
FIG. 10 is a functional block diagram of the autopilot subsystem.
Figure 11:
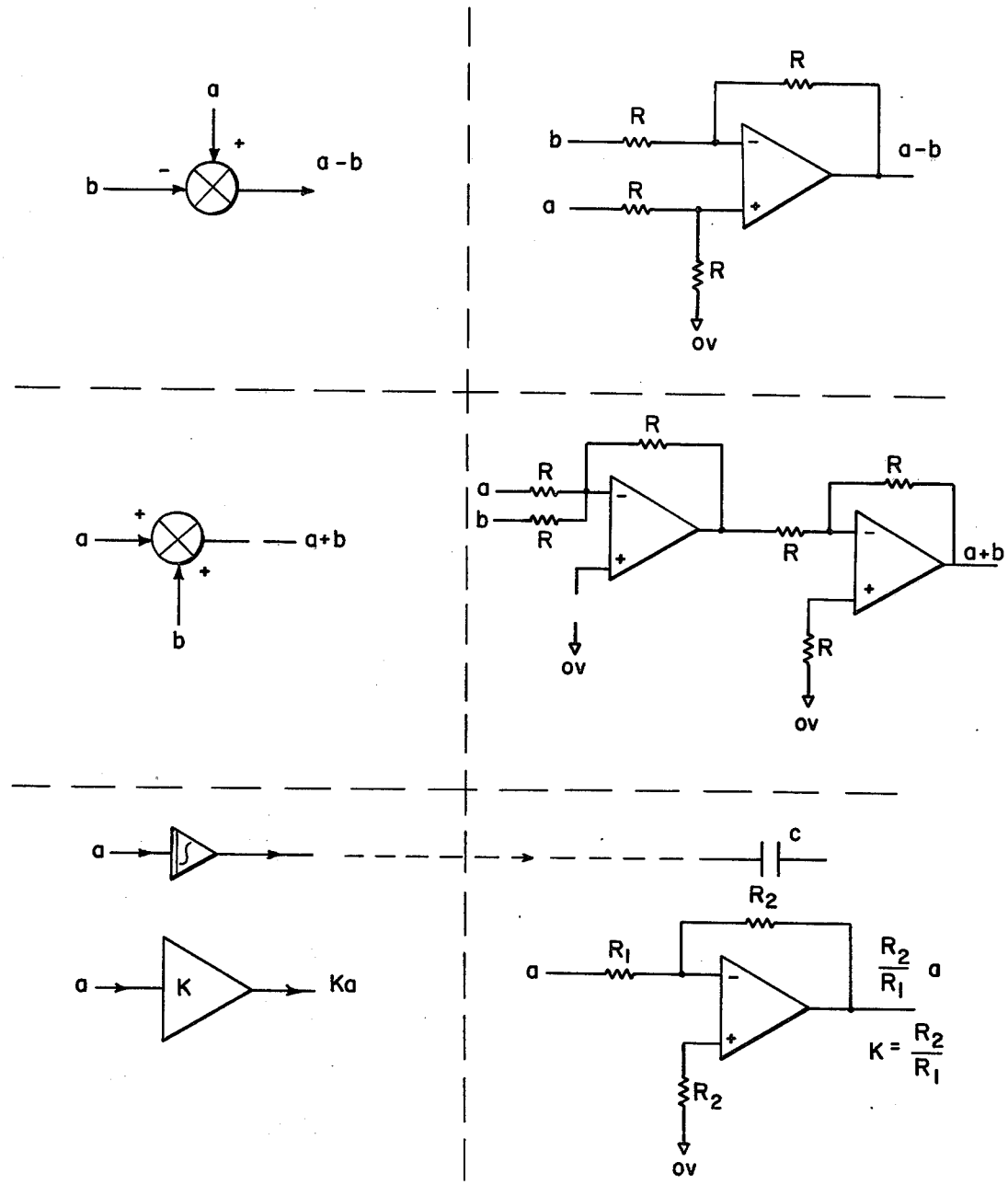
FIG. 11 schematically details the hardware equivalents of several of the functional block diagram elements.

Referring now to FIG. 10, the functional block diagram of the autopilot subsystem is detailed. The output of amplifier 76 is coupled to the noninverting input of a summer 86. The output of limiter 70 is coupled to a second noninverting input of summer 86. The output of summer 86 is coupled to multipliers 78 and 80 as previously shown on FIG. 9. The second inputs to multipliers 78 and 80 are respectively supplied by the cosine and sine outputs of sine/cosine multiplier 34. The output of multiplier 78 is coupled through summer 74 to the pitch thruster and the output of multiplier 80 is coupled through summer 84 to yaw thruster as shown on FIG. 9. In essence, the limiter error signal and the pitch damping are added together to form the thruster commands.

Therefore, it is apparent that there has been provided an inertial guidance system capable of intercepting a point in space defined by a separate target localization means. Compared with conventional full up platform inertial guidance systems, the system according to the present invention can be produced at a significant cost saving. This design allows for fast start up time, small size and the ability to be shock hardened. The system operates in missiles not having active roll control.

Naturally, the functional block diagram of the system according to the present invention can be implemented in a variety of methods. Analog modules are contemplated, however the entire block diagram could be functionally implemented using digital devices, either discreet or by the use of a microprocessor or other computer device.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed and desired to be secured by Letters Patent of the United States:

1. An ordnance guidance system for use with an external target localization means wherein said target localization means provides pre-launch target bearing, range, and elevation angle information to said ordnance relative to an inertial coordinate system centered at the intended target including "x", "y", and "z" mutually orthogonal axes, comprising:
   a pitch rate sensor;
   a yaw rate sensor;
   a roll rate sensor;
   an acceleration sensor for measuring the component of acceleration in the direction of said ordnance's centerline;
   means coupled to said pitch, yaw, and roll rate sensors for determining the elevation angle of said ordnance's velocity vector, and for producing a signal proportional to the rate of change of the elevation angle of said velocity vector, and for producing signals proportional to the sine and cosine of the bearing angle of said target within said inertial coordinate system;
   means coupled to said acceleration sensor and to said velocity vector elevation angle determining means for defining target coordinates in a target plane including said "z" axis and said target, and for producing signals proportional to the sine and cosine of said velocity vector elevation angle;
   means coupled to said target coordinate defining means for developing a thruster error signal proportional to the difference between said target elevation angle and said elevation angle of said velocity vector; and
   means coupled to said pitch rate sensor, said velocity vector elevation angle determining means, and said thruster error signal developing means for producing pitch and yaw thruster commands, whereby said pitch and yaw thruster commands cause said ordnance's velocity vector to continuously be corrected to point toward said target while said ordnance is constrained to fly in said target plane.

2. The system of claim 1 wherein said velocity vector elevation angle determining means comprises:
   a first multiplier having two inputs and an output wherein one of said inputs is coupled to said yaw rate sensor;
   a second multiplier having two inputs and an output wherein one of said inputs is coupled to said pitch rate sensor;
   a first integrator having an input and an output wherein said input is coupled to said roll rate sensor for producing a signal proportional to the bearing of said target relative to said "z" axis;

a sine/cosine module coupled to said output of said first integrator for producing signals proportional to the sine and cosine of said bearing angle signal produced by said first integrator, said sine signal being coupled to said second input of said first multiplier and said cosine signal being coupled to said second input of said second multiplier;

a summer having two non-inverting inputs and an output wherein one of said inputs is coupled to said output of said first multiplier and said other input is coupled to said output of said second multiplier; and a second integrator having an input and an output wherein said input is coupled to said output of said summer for producing a signal proportional to the elevation angle of said ordnance's velocity vector at said output of said second integrator, said output signal of said second integrator also being the output of said velocity vector elevation angle determining means.

3. The system of claim 1 wherein said target coordinate defining means comprises:

a sine/cosine module coupled to said output of said velocity vector elevation angle determining means, for producing signals proportional to the sine and cosine of said elevation angle of said velocity vector;

a "G" reference module for producing a signal representing the constant equivalent to the acceleration of a falling body due to gravity;

a summer having inverting and non-inverting inputs and an output wherein said non-inverting input is coupleld to said acceleration sensor;

a first multiplier having two inputs and an output, wherein one of said inputs is coupled to said "G" reference module and said other input is coupled to said cosine signal from said sine/cosine module, and said output of said first multiplier is coupled to said inverting input of said summer;

a first integrator having an input and an output wherein said input is coupled to said output of said summer;

a second multiplier having two inputs and an output wherein one of said inputs is coupled to said output of said first integrator and said other input is coupled to said cosine signal from said sine/cosine module;

a third multiplier having two inputs and an output wherein one of said inputs is coupled to said output of said first integrator and said second input is coupled to said sine signal from said sine/cosine module;

a second integrator having an input and an output wherein said input is coupled to said output of said third multiplier for producing a signal proportional to the position of said ordnance with respect to said "x" axis of said target plane; and a third integrator having an input and an output wherein said input is coupled to said output of said second multiplier for producing a signal proportional to the position of said ordnance with respect to said "z" axis of said target plane at said output of said third integrator, whereby the position of said ordnance within said target plane is defined.

4. The system of claim 3 wherein said velocity vector elevation angle determining means comprises:

a fourth multiplier having two inputs and an output wherein one of said inputs is coupled to said yaw rate sensor;

a fifth multiplier having two inputs and an output wherein one of said inputs is coupled to said pitch rate sensor;

a fourth integrator having an input and an output wherein said input is coupled to said roll rate sensor for producing a signal proportional to the bearing of said target relative to said "z" axis;

a second sine/cosine module coupled to said output of said fourth integrator for producing signals proportional to the sine and cosine of said bearing angle signal produced by said fourth integrator, said sine signal being coupled to said second input of said fourth multiplier and said cosine signal being coupled to said second input of said fifth multiplier;

a second summer having two non-inverting inputs and an output wherein one of said inputs is coupled to said output of said fourth multiplier and said other input is coupled to said output of said fifth multiplier; and a fifth integrator having an input and an output wherein said input is coupled to said output of said second summer for producing a signal proportional to the elevation angle of said ordnance's velocity vector at said output of said fifth integrator, said fifth integrator output signal also being the output of said velocity vector elevation angle determining means.

5. The system of claim 3 wherein said thruster error signal developing means comprises:

a rectangular to polar coordinate converter having inputs coupled to said outputs of said second and said third integrators, for producing signals proportional to the sine and cosine of the target elevation angle relative to said "z" axis;

a fourth multiplier having two inputs and an output wherein one of said inputs is coupled to said sine signal from said rectangular to polar coordinate converter and said other input is coupled to said cosine signal from said target coordinate defining means;

a fifth multiplier having two inputs and an output, wherein said first input is coupled to said cosine signal from said rectangular to polar coordinate converter and said second input is coupled to said sine signal from said target coordinate defining means;

a second summer having inverting and non-inverting inputs and output wherein said inverting input is coupled to said output of said fourth multiplier and said non-inverting input is coupled to said output of said fifth multiplier for producing at said second summer output a signal proportional to the sine of the angular difference between the elevation angle of said ordnance's velocity vector and the angle of the target elevation relative to said "z" axis;

an amplifier having an input and an output wherein said input is coupled to said output of said second summer; and a limiter having an input and an output wherein said input is coupled to said output of said amplifier, whereby an error signal is produced at said output of said limiter proportional to the difference between said target elevation angle and said elevation angle of said velocity vector.

6. The system of claim 5 wherein said pitch and yaw thruster command producing means comprises:
- a second amplifier having an input and an output wherein said input is coupled to said pitch rate sensor;
- a third amplifier having an input and an output wherein said input is coupled to said signal proportional to the rate of change of said elevation angle of said velocity vector;
- a fourth amplifier having an input and an output wherein said input is coupled to said yaw rate sensor;
- a sixth multiplier having two inputs and an output wherein one of said inputs is coupled to said output of said third amplifier and said other input is coupled to said cosine signal from said velocity vector angle determining means;
- a seventh multiplier having two inputs and an output wherein one of said inputs is coupled to said output of said third amplifier and said other input is coupled to said sine signal from said velocity vector angle determining means;
- a third summer having inverting and non-inverting inputs and an output, wherein said inverting input is coupled to said output of said second amplifier and said non-inverting input is coupled to said output of said sixth multiplier, whereby said third summer output is the pitch thruster command of said pitch and yaw thruster command producing means; and
- a fourth summer having inverting and non-inverting inputs and an output wherein said inverting input is coupled to said output of said fourth amplifier and said non-inverting input is coupled to said output of said seventh multiplier, whereby said output of said fourth summer is the yaw thruster command of said pitch and yaw thruster command producing means.

7. The system of claim 9 wherein said velocity vector elevation angle determining means comprises:
- a sixth multiplier having two inputs and an output wherein one of said inputs is connected to said yaw rate sensor;
- a seventh multiplier having two inputs and an output wherein one of said inputs is coupled to said pitch rate sensor;
- a fourth integrator having an input and an output wherein said input is coupled to said roll rate sensor for producing a signal proportional to the bearing of said target relative to said "z" axis;
- a second sine/cosine module coupled to said output of said fourth integrator for producing signals proportional to the sine and cosine of said bearing angle signal produced by said fourth integrator, said bearing angle sine signal being coupled to said second input of sixth multiplier and said bearing angle cosine signal being coupled to said second input of said seventh multiplier;
- a third summer having two non-inverting inputs and an output wherein one of said inputs is coupled to said output of said sixth multiplier and said other input is coupled to said output of said seventh multiplier; and
- a fifth integrator having an input and an output wherein said input is coupled to said output of said third summer for producing a signal proportional to the elevation angle of said ordnance's velocity vector at said output of said fifth integrator, said fifth integrator output signal also being the output of said velocity vector elevation angle determining means.

8. The system of claim 7 wherein said pitch and yaw thruster command producing means comprises:
- a second amplifier having an input and an output wherein said input is coupled to said output of said third summer;
- a fourth summer having two non-inverting inputs and an output wherein one of said inputs is coupled to said output of said second amplifier and said other input is coupled to said output of said limiter;
- an eighth multiplier having two inputs and an output wherein one of said inputs is coupled to said output of said fourth summer and said other input is coupled to said cosine signal from said second sine/cosine module, whereby said output of said eighth multiplier is the pitch thruster command of said pitch and yaw thruster command producing means; and
- a ninth multiplier having two inputs and an output wherein one of said inputs is coupled to said output of said fourth summer and said other input is coupled to said sine signal from said second sine/cosine module, whereby said output of said ninth multiplier is the yaw thruster command of said pitch and yaw thruster command producing means.

9. The system of claim 3 wherein said pitch and yaw thruster command producing means comprises:
- a first amplifier having an input and an output wherein said input is coupled to said pitch rate sensor;
- a second amplifier having an input and an output wherein said input is coupled to said signal proportional to the rate of change of said elevation angle of said velocity vector;
- a third amplifier having an input and an output wherein said input is coupled to said yaw rate sensor;
- a fourth multiplier having two inputs and an output wherein one of said inputs is coupled to said output of said second amplifier and said other input is coupled to said cosine signal from said velocity vector angle determining means;
- a fifth multiplier having two inputs and an output wherein one of said inputs is coupled to said output of said second amplifier and said other input is coupled to said sine signal from said velocity vector angle determining means;
- a second summer having inverting and non-inverting inputs and an output, wherein said inverting input is coupled to said ouput of said first amplifier and said non-inverting input is coupled to said output of said fourth multiplier, whereby said second summer output is the pitch thruster command of said pitch and yaw thruster command producing means; and
- a third summer having inverting and noninverting inputs and an output wherein said inverting input is coupled to said output of said third amplifier and said non-inverting input is coupled to said output of said fifth multiplier, whereby said output of said third summer is the yaw thruster command of said pitch and yaw thruster command producing means.

10. The system of claim 1 wherein said thruster error signal developing means comprises:

a rectangular to polar coordinate converter having inputs coupled to said target coordinate defining means for producing signals proportional to the sine and cosine of the target elevation angle relative to said "z" axis;

first multiplier having two inputs and an output wherein one of said inputs is coupled to said sine signal from said rectangular to polar coordinate converter and said other input is coupled to said cosine signal from said target coordinate defining means;

a second multiplier having two inputs and an output, wherein said first input is coupled to said cosine signal from said rectangular to polar coordinate converter and said second input is coupled to said sine signal from said target coordinate defining means;

a summer having inverting and non-inverting inputs and an output wherein said inverting input is coupled to said output of said first multiplier and said non-inverting input is coupled to said output of said second multiplier for producing at said summer output a signal proportional to the sine of the angular difference between the elevation angle of said ordnance's velocity vector and the angle of the target elevation relative to said "z" axis;

an amplifier having an input and an output wherein said input is coupled to said output of said summer; and a limiter having an input and an output wherein said input is coupled to said output of said amplifier, whereby an error signal is produced at said output of said limiter proportional to the difference between said target elevation angle and said elevation angle of said velocity vector.

11. The system of claim 10 wherein said velocity vector elevation angle determining means comprises:

a third multiplier having two inputs and an output wherein one of said inputs is coupled to said yaw rate sensor;

a fourth multiplier having two inputs and an output wherein one of said inputs is coupled to said pitch rate sensor;

a first integrator having an input and an output wherein said input is coupled to said roll rate sensor for producing a signal proportional to the bearing of said target relative to said "z" axis;

a sine/cosine module coupled to said output of said first integrator for producing signals proportional to the sine and cosine of said bearing angle signal produced by said first integrator, said sine signal being coupled to said second input of said third multiplier and said cosine signal being coupled to said second input of said fourth multiplier;

a second summer having two non-inverting inputs and an output wherein one of said inputs is coupled to said output of said third multiplier and said other input is coupled to said output of said fourth multiplier; and a second integrator having an input and an output wherein said input is coupled to said output of said second summer for producing a signal proportional to the elevation angle of said ordnance's velocity vector at said output of said second integrator, said second integrator output signal also being the output of said velocity vector elevation angle determining means.

12. The system of claim 11 wherein said pitch and yaw thruster command producing means comprises:

a second amplifier having an input and an output wherein said input is coupled to said pitch rate sensor;

a third amplifier having an input and an output wherein said input is coupled to said output of said second summer;

a fourth amplifier having an input and an output wherein said input is coupled to said yaw rate sensor;

a fifth multiplier having two inputs and an output wherein one of said inputs is coupled to said output of said third amplifier and said other input is coupled to said cosine signal from said sine/cosine module;

a sixth multiplier having two inputs and an output wherein one of said inputs is coupled to said output of said third amplifier and said other input is coupled to said sine signal from said sine/cosine module;

a third summer having inverting and non-inverting inputs and an output, wherein said inverting input is coupled to said output of said second amplifier and said non-inverting input is coupled to said output of said fifth multiplier, whereby said third summer output is the pitch thruster command of said pitch and yaw thruster command means; and a fourth summer having inverting and non-inverting inputs and an output wherein said inverting input is coupled to said output of said fourth amplifier and said non-inverting input is coupled to said output of said sixth multiplier, whereby said output of said fourth summer is the yaw thruster command of said pitch and yaw thruster command producing means.

13. The system of claim 1 wherein said pitch and yaw thruster command producing means comprises:

a first amplifier having an input and an output wherein said input is coupled to said pitch rate sensor;

a second amplifier having an input and an output wherein said input is coupled to said signal proportional to the rate of change of said elevation angle of said velocity vector;

a third amplifier having an input and an output wherein said input is coupled to said yaw rate sensor;

a first multiplier having two inputs and an output wherein one of said inputs is coupled to said output of said second amplifier and said other input is coupled to said cosine signal from said velocity vector angle determining means;

a second multiplier having two inputs and an output wherein one of said inputs is coupled to said output of said second amplifier and said other input is coupled to said sine signal from said velocity vector angle determining means;

a first summer having inverting and non-inverting inputs and an output, wherein said inverting input is coupled to said output of said first amplifier and said non-inverting input is coupled to said output of said first multiplier, whereby said first summer output is the pitch thruster command of said pitch and yaw thruster command producing means; and a second summer having inverting and non-inverting inputs and an output wherein said inverting input is coupled to said output of said third amplifier and said non-inverting input is coupled to said output of said second multiplier, whereby said output of said second summer is the yaw thruster command of said pitch and yaw thruster command producing means.

14. The system of claim 13 wherein said velocity vector elevation angle determining means comprises:
- a third multiplier having two inputs and an ouput wherein one of said inputs is coupled to said yaw rate sensor;
- a fourth multiplier having two inputs and an output wherein one of said inputs is coupled to said pitch rate sensor;
- a first integrator having an input and an output wherein said input is coupled to said roll rate sensor for producing a signal proportional to the bearing of said target relative to said "z" axis;
- a sine/cosine module coupled to said output of said first integrator for producing signals proportional to the sine and cosine of said bearing angle signal produced by said first integrator, said sine signal being coupled to said second input of said third multiplier and said cosine signal being coupled to said second input of said fourth multiplier
- a third summer having two non-inverting inputs and an output wherein one of said inputs is coupled to said output of said third multiplier and said other input is coupled to said output of said fourth multiplier; and
- a second integrator having an input and an output wherein said input is coupled to said output of said third summer for producing a signal proportional to the elevation angle of said ordnance's velocity vector at said output of said second integrator, said second integrator output signal also being the output of said velocity vector elevation angle determining means; and wherein said thruster error signal developing means comprises:
- a rectangular to polar coordinate converter having inputs coupled to said target coordinate defining means, for producing signals proportional to the sine and cosine of the target elevation angle relative to said "z" axis;
- a fifth multiplier having two inputs and an output wherein one of said inputs is coupled to said sine signal from said rectangular to polar coordinate converter and said other input is coupled to said cosine signal from said target coordinate defining means;
- a sixth multiplier having two inputs and an output, wherein said first input is coupled to said cosine signal from said rectangular to polar coordinate converter and said second input is coupled to said sine signal from said target coordinate defining means;
- a fourth summer having inverting and non-inverting inputs and an output wherein said inverting input is coupled to said output of said fifth multiplier and said noninverting input is coupled to said ouput of said sixth multiplier for producing at said fourth summer output a signal proportional to the sine of the angular difference between the elevation angle of said ordnance velocity vector and the angle of the target elevation relative to said "z" axis;
- a fourth amplifier having an input and an output wherein said input is coupled to said output of said fourth summer; and
- a limiter having an input and an output wherein said input is coupled to said output of said fourth amplifier, whereby an error signal is produced at said output of said limiter proportional to the difference between said target elevation angle and said elevation angle of said velocity vector.

15. The system of claim 14 wherein said target coordinate defining means comprises:
- a second sine/cosine module coupled to said output of said second integrator, for producing signals proportional to the sine and cosine of said elevation angle of said velocity vector;
- a "G" reference module for producing a signal representing the constant equivalent to the acceleration of a falling body due to gravity;
- a fifth summer having inverting and non-inverting inputs and an ouput wherein said non-inverting input is coupled to said acceleration sensor;
- a seventh multiplier having two inputs and an output, wherein one of said inputs is coupled to said "G" reference module and said other input is coupled to said cosine signal from said second sine/cosine module, and said output of said seventh multiplier is coupled to said inverting input of said fifth summer;
- a third integrator having an input and an output wherein said input is coupled to said output of said fifth summer:
- an eighth multiplier having two inputs and an output wherein one of said inputs is coupled to said output of said third integrator and said other input is coupled to said cosine signal from said sine/cosine module;
- a ninth multiplier having two inputs and an output wherein one of said inputs is coupled to said output of said third integrator and said second input is coupled to said sine signal from said second sine/cosine module;
- a fourth integrator having an input and an ouput wherein said input is coupled to said output of said ninth multiplier for producing a signal proportional to the position of said ordnance with respect to said "x" axis of said target plane; and
- a fifth integrator having an input and an output wherein said input is coupled to said output of said eighth multiplier for producing a signal proportional to the position of said ordnance with respect to said "z" axis of said target plane at said output of said fifth integrator, wherein the position of said ordnance within said target plane is defined.

16. The system of claim 13 wherein said thruster error signal developing means comprises:
- a rectangular to polar coordinate converter having inputs coupled to said target coordinate defining means, for producing signals proportional to the sine and cosine of the target elevation angle relative to said "z" axis;
- a third multiplier having two inputs and an output wherein one of said inputs is coupled to said sine signal from said rectangular to polar coordinate converter and said other input is coupled to said cosine signal from said target coordinate defining means;
- a fourth multiplier having two inputs and an output, wherein one of said inputs is coupled to said cosine signal from said rectangular to polar coordinate converter and said other input is coupled to said sine signal from said target coordinate defining means;

a third summer having inverting and non-inverting inputs and an output wherein said inverting input is coupled to said output of said third multiplier and said non-inverting input is coupled to said output of said fourth multiplier for producing at said third summer output a signal proportional to the sine of the angular difference between the elevation angle of said ordnance's velocity vector and the angle of the target elevation relative to said "z" axis;

a fourth amplifier having an input and an ouput wherein said input is coupled to said output of said third summer; and a limiter having an input and an output wherein said input is coupled to said output of said fourth amplifier, whereby an error signal is produced at said output of said limiter proportional to the difference between said target elevation angle and said elevation angle of said velocity vector.

* * * * *